United States Patent
Torudbakken et al.

(10) Patent No.: US 12,073,262 B2
(45) Date of Patent: Aug. 27, 2024

(54) BARRIER SYNCHRONIZATION BETWEEN HOST AND ACCELERATOR OVER NETWORK

(71) Applicant: Graphcore Limited, Bristol (GB)

(72) Inventors: Ola Torudbakken, Oslo (NO); Wei-Lin Guay, Hvalstad (NO)

(73) Assignee: GRAPHCORE LIMITED, Bristol (GB)

(*) Notice: Subject to any disclaimer, the term of this patent is extended or adjusted under 35 U.S.C. 154(b) by 237 days.

(21) Appl. No.: 17/338,898

(22) Filed: Jun. 4, 2021

(65) Prior Publication Data
US 2022/0019487 A1    Jan. 20, 2022

(30) Foreign Application Priority Data

Jul. 14, 2020  (GB) .................................... 2010810

(51) Int. Cl.
| | |
|---|---|
| *G06F 9/52* | (2006.01) |
| *G06F 9/38* | (2018.01) |
| *G06F 9/54* | (2006.01) |
| *G06F 15/173* | (2006.01) |

(52) U.S. Cl.
CPC ............ *G06F 9/522* (2013.01); *G06F 9/3851* (2013.01); *G06F 9/543* (2013.01); *G06F 9/544* (2013.01); *G06F 15/173* (2013.01); *G06F 15/17325* (2013.01)

(58) Field of Classification Search
None
See application file for complete search history.

(56) References Cited

U.S. PATENT DOCUMENTS

| | | | | |
|---|---|---|---|---|
| 6,263,406 B1 * | 7/2001 | Uwano | ..................... | G06F 9/52 711/124 |
| 8,924,654 B1 * | 12/2014 | Graziano | .................. | G06F 9/52 711/147 |
| 11,360,934 B1 * | 6/2022 | Abts | ..................... | G06F 9/3851 |

(Continued)

FOREIGN PATENT DOCUMENTS

| | | | | |
|---|---|---|---|---|
| JP | 2019079530 A | * | 5/2019 | .......... G06F 9/3009 |
| WO | 19086120 A1 | | 5/2019 | |
| WO | 2020007738 A1 | | 1/2020 | |

OTHER PUBLICATIONS

International Search Report and Written Opinion for PCT/EP2020/087563 dated Apr. 14, 2021. 13 pages.

(Continued)

*Primary Examiner* — Abu Zar Ghaffari
(74) *Attorney, Agent, or Firm* — HAYNES AND BOONE, LLP

(57) ABSTRACT

A host system compiles a set of local programs which are provided over a network to a plurality of subsystems. By defining the synchronisation activity on the host, and then providing that information to the subsystems, the host can service a large number of subsystems. The defined synchronisation activity includes defining the synchronisation groups between which synchronisation barriers occur and the points during program execution at which data exchange with the host occurs. Defining synchronisation activity between the subsystems allows a large number of subsystems to be connecting whilst minimising the required exchanges with the host.

18 Claims, 12 Drawing Sheets

(56) References Cited

U.S. PATENT DOCUMENTS

| | | | | |
|---|---|---|---|---|
| 2008/0059771 | A1* | 3/2008 | Svendsen | G06F 9/3851 |
| | | | | 712/34 |
| 2008/0109569 | A1* | 5/2008 | Leonard | G06F 15/16 |
| | | | | 710/22 |
| 2010/0095090 | A1* | 4/2010 | Unno | G06F 9/52 |
| | | | | 712/30 |
| 2010/0124231 | A1* | 5/2010 | Kompella | H04L 61/5061 |
| | | | | 370/401 |
| 2012/0179896 | A1 | 7/2012 | Salapura | |
| 2014/0164735 | A1* | 6/2014 | Dobbs | G06F 9/522 |
| | | | | 712/30 |
| 2014/0207971 | A1* | 7/2014 | Lecourtier | G06F 1/10 |
| | | | | 709/248 |
| 2014/0258693 | A1* | 9/2014 | Lindholm | G06F 9/30072 |
| | | | | 712/233 |
| 2017/0322893 | A1 | 11/2017 | Tourrilhes et al. | |
| 2018/0307985 | A1* | 10/2018 | Appu | G06N 3/063 |
| 2019/0080233 | A1* | 3/2019 | Procter | G06N 3/045 |
| 2019/0121387 | A1 | 4/2019 | Knowles et al. | |
| 2019/0121641 | A1 | 4/2019 | Knowles et al. | |
| 2019/0121680 | A1* | 4/2019 | Wilkinson | G06F 9/3851 |
| 2019/0121784 | A1 | 4/2019 | Wilkinson | |
| 2019/0121785 | A1 | 4/2019 | Wilkinson et al. | |
| 2020/0012537 | A1 | 1/2020 | Lacey | |
| 2020/0104269 | A1* | 4/2020 | Pope | G06F 9/5077 |
| 2020/0293368 | A1* | 9/2020 | Andrei | G06F 9/52 |
| 2020/0412802 | A1* | 12/2020 | Yang | G06F 15/76 |

OTHER PUBLICATIONS

Japanese Office Action dated Dec. 26, 2023 for Japanese Patent Application No. 2023-502602.

* cited by examiner

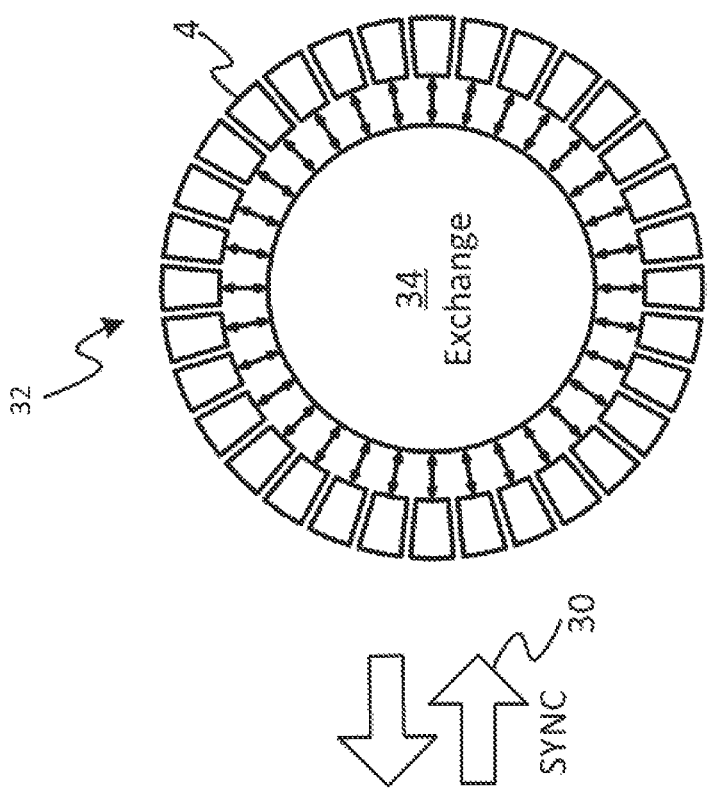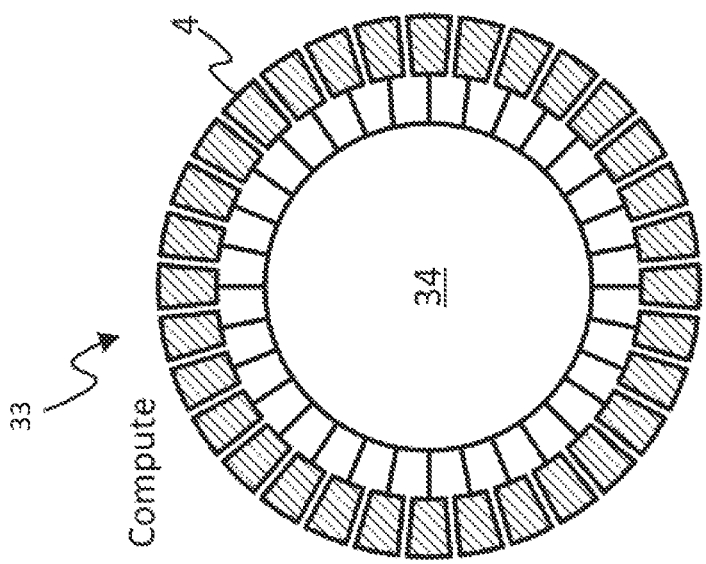
Fig. 2

US 12,073,262 B2

BARRIER SYNCHRONIZATION BETWEEN HOST AND ACCELERATOR OVER NETWORK

CROSS-REFERENCE TO RELATED APPLICATIONS

The present application claims priority to United Kingdom Patent Application No. 2010810.6, filed on Jul. 14, 2020, the disclosure of which is hereby incorporated herein by reference in its entirety.

TECHNICAL FIELD

The present application relates to a host system and a processing unit communicating over a network.

BACKGROUND

In the context of processing data for complex or high volume applications, a work accelerator may be a subsystem to which processing of certain data is offloaded from a host system. Such a work accelerator may have a specialised hardware for performing specific types of processing.

As an example, one area of computing in which such a specialised accelerator subsystem may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a work accelerator specialised for machine intelligence applications may comprise a large degree of multi-threading. One form of parallelism can be achieved by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables data to be exchanged between them. Such an accelerator may function as a subsystem for a host system to perform parallel processing of data sets provided to it.

In general, there may exist dependencies between the portions of a program running on different tiles. A technique is, therefore, required to prevent a piece of code on one tile running ahead of data upon which it is dependent being made available by another piece of code on another tile. There are a number of possible schemes for achieving this, one of which is described here by way of example, 'BSP', bulk synchronous parallel. According to BSP, each tile performs a compute phase and an exchange phase in an alternating cycle. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet proceed to the next compute phase. Further, according to the BSP principle, a barrier synchronization is placed at the juncture transitioning from the compute phase into the exchange phase, or transitioning from the exchange phase into the compute phase, or both. That is to say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both. In some scenarios a tile performing computation may be allowed to communicate with other system resources such as a network card or storage disk, as long as no communication with other tiles in the group is involved.

During an exchange phase, data exchange may not only take place internally (i.e. between tiles) within an accelerator, but in some circumstances may be required to take place between an accelerator and a further accelerator or between the accelerator and a host system. When a subsystem acts as a work accelerator, it is configured to process data sets provided to it (e.g. from a host system or from another form of storage in an extended system).

In order to provide workloads from the host to one or more subsystems, a host may be connected locally to those subsystems over a PCIe interface. This allows for the transfer of data between the host and the one or more subsystems at low latency. However, one problem is that there are limited number of subsystems to which the host can be directly connected over a PCIe connection. Therefore, challenges are presented when attempting to scale up the number of subsystems so as to run larger applications, since there is a problem with how to achieve data exchange between those subsystems and the host.

SUMMARY

In order to process larger applications, it is desirable to connect together larger number of accelerator subsystems that can act as work accelerators to a host. One proposal to achieve this is to connect the host to the accelerator subsystems over a network. There is a delay between a host device receiving the results from computations performed by the subsystems and, in response, providing further workloads to the subsystems. This is especially the case when those workloads may depend upon results output by other subsystems. In some cases, the host must receive results from one subsystem and provide results to another subsystem.

According to a first aspect, there is provided a host system configured to interface over a network with a plurality of subsystems acting as work accelerators to the host system in accordance with local programs running on each of the one or more subsystems, wherein the host system comprises at least one processor and at least one memory storing computer readable instructions, wherein the at least one processor of the host system is configured to execute the computer readable instructions to compile a set of local programs, each local program for running on each of the one or more subsystems, wherein the step of compiling the source code comprises defining a set of synchronisation groups, each synchronisation group comprising at least some of the subsystems, wherein each local program comprises: a set of compute instructions to perform, when executed by at least one processor of the respective subsystem, compute operations during one or more of a plurality of compute phases of the respective subsystem; and a set of data transfer instructions to, when executed by at least one processor of the respective subsystem, perform a plurality of barrier synchronisations at predefined points in the execution of the respective local program, wherein each of at least some of the barrier synchronisations is defined between one of the synchronisation groups, wherein at least one of the barrier synchronisations is a synchronisation requiring host involvement following which, in response to an initiator of data transfer provided to the host system by the respective subsystem, data exchange is performed between the respective subsystem and the host system, wherein the at least one processor of the host system is configured to, in response to each of the received initiators of data transfer, exchange data over the network with one of the subsystems from which the identifier was received.

By defining the synchronisation activity on the host, and then providing that information to the subsystems, the host can service a large number of subsystems. The defined synchronisation activity includes defining the synchronisation groups between which synchronisation barriers occur and the points during program execution at which data exchange with the host occurs. Defining synchronisation activity between the subsystems allows a large number of subsystems to be connecting whilst minimising the required exchanges with the host.

In some embodiments, the exchange of data over the network with the one of the subsystems from which the identifier was received occurs using remote direct memory access.

In some embodiments, the network is an Ethernet network.

In some embodiments, the step of exchanging data over the network with the one of the subsystems from which the identifier was received comprises: synchronising at least part of a buffer of the host system with at least part of the buffer of a network interface device accessible to the one of the subsystems from which the identifier was received.

In some embodiments, each of the received initiators of data transfer comprises an identifier of a stream between the host subsystem and the one of the subsystems from which the identifier was received, wherein the step of exchanging data over the network with one of the subsystems from which the identifier was received comprises sending and/or receiving data belonging to the respective identified stream.

In some embodiments, the at least part of the buffer of the host system comprises a part of the buffer associated with the identified stream, wherein the at least part of the buffer of the network interface device accessible to the one of the subsystems from which the identifier was received comprises a part of the buffer associated with the identified stream.

In some embodiments, the step of exchanging data over the network with one of the subsystems from which the identifier was received comprises: prior to one of the plurality of barrier synchronisations defined in the local program of the subsystem from which the identifier was received, sending data to a network interface device accessible to that subsystem; and following the one of the plurality of barrier synchronisations defined in the local program of the subsystem from which the identifier was received, receiving data from the network interface device accessible to that subsystem.

In some embodiments, the at least one processor of the host system is configured to cause each of the local programs to be dispatched to the respective subsystems over the network.

According to a second aspect, there is provided a subsystem configured to interface over a network with a host system, wherein the subsystem is configured to act as a work accelerator to the host system in accordance with a local program running on at least one processor of the subsystem, wherein the subsystem comprises an interface configured to receive from the host system over the network, the local program, wherein the local program comprises: an indication of a set of synchronisation groups, each of at least some of the synchronisation groups comprising the subsystem and one or more further subsystems for acting as accelerators to the host; a set of compute instructions to perform, when executed by the at least one processor, a plurality of compute operations during one or more of a plurality of compute phases of the subsystem; and a set of data transfer instructions to, when executed by the at least one processor, perform a plurality of barrier synchronisations at predefined points in the execution of the respective local program, wherein each of at least some of the barrier synchronisations is defined between subsystems of one of the synchronisation groups, wherein at least one of the barrier synchronisations is a synchronisation requiring host involvement following which, following sending of an initiator of data transfer to the host system by the subsystem, data exchange is performed over the network between the subsystem and the host system.

In some embodiments, the data exchange between the subsystem and the host system occurs using remote direct memory access.

In some embodiments, the network is an Ethernet network.

In some embodiments, wherein the data exchange between the subsystem and the host system comprises: the at least one processor causing data exchange with a buffer of a network interface device for the subsystem, at least part of the buffer being synchronised with at least part of the buffer of the host system.

In some embodiments, wherein the initiator of data transfer comprises an identifier of a stream between the subsystem and the host subsystem, wherein the data exchange between the subsystem and the host system comprises exchanging data belonging to the respective identified stream.

In some embodiments, the at least part of the buffer of the network interface device comprises a part of the buffer associated with the identified stream.

In some embodiments, the data exchange between the subsystem and the host system comprises: prior to one of the plurality of barrier synchronisations defined in the local program of the subsystem from which the identifier was received, sending data to a network interface device accessible to that subsystem; and following the one of the plurality of barrier synchronisations defined in the local program of the subsystem from which the identifier was received, receiving data from the network interface device accessible to that subsystem.

In some embodiments, the interface is configured to receive the local program from the host system over the network.

According to a third aspect, there is provided a method implemented in a host system, the method comprising: interfacing over a network with a plurality of subsystems acting as work accelerators to the host system in accordance with local programs running on each of the one or more subsystems, the method comprising: compiling a set of local programs, each local program for running on each of the one or more subsystems, wherein the step of compiling the source code comprises defining a set of synchronisation groups, each synchronisation group comprising at least some of the subsystems, wherein each local program comprises: a set of compute instruction to perform, when executed by at least one processor of the respective subsystem, compute operations during one or more of a plurality of compute phases of the respective subsystem; and a set of data transfer instructions to, when executed by at least one processor of the respective subsystem, perform a plurality of barrier synchronisations at predefined points in the execution of the respective local program, wherein each of at least some of the barrier synchronisations is defined between subsystems of one of the synchronisation groups, wherein at least one of the barrier synchronisations is a synchronisation requiring host involvement following which, in response to an initiator of data transfer provided to the host system by the respective subsystem, data exchange is performed between the respective subsystem and the host system, the method comprising, in response to each of the received initiators of data transfer, exchange data over the network with one of the subsystems from which the identifier was received.

According to a fourth aspect, there is provided a computer program, which when executed by at least one processor of a host system causes a method according to the third aspect to be carried out.

According to a fifth aspect, there is provided a non-transitory computer readable medium storing the compute program according to the fourth aspect.

According to a sixth aspect, there is provided a method implemented in a subsystem for a host system, the method comprising: interfacing over a network with a host system; receiving from the host system over the network, a local program; acting as a work accelerator to the host system in accordance with the local program running on at least one processor of the subsystem, wherein the local program comprises an indication of a set of synchronisation groups, each of at least some of the synchronisation groups comprising the subsystem and one or more further subsystems for acting as accelerators to the host; executing compute instructions of the local program to perform compute operations during one or more of a plurality of compute phases of the subsystem; executing data transfer instructions of the local program to perform a plurality of barrier synchronisations at predefined points in the execution of the local program, wherein each of at least some of the barrier synchronisations are defined between subsystem of one of the synchronisation groups, wherein at least one of the barrier synchronisations is a synchronisation requiring host involvement following which, following sending of an initiator of data transfer to the host system by the subsystem, data exchange is performed over the network between the respective subsystem and the host system.

According to a seventh aspect, there is provided a computer program, which when executed by at least one processor of a subsystem causes a method according to the sixth aspect.

According to an eighth aspect, there is provided a non-transitory computer readable medium storing the compute program according to the seventh aspect.

BRIEF DESCRIPTION OF THE DRAWING

For a better understanding of the present invention and to show how the same may be carried into effect, reference will now be made by way of example to the accompanying Figures in which:

FIG. 2 is a schematic illustration of a bulk synchronous parallel (BSP) computing model;

DETAILED DESCRIPTION

This application relates to method and system in which a host system compiles and transfers a set of local programs for execution on processing units. The processing units synchronise with one another and exchange data with the host at predefined points inserted into the compiled code. An example of a processing unit in which embodiments made be implemented is first described.

Figure 1:
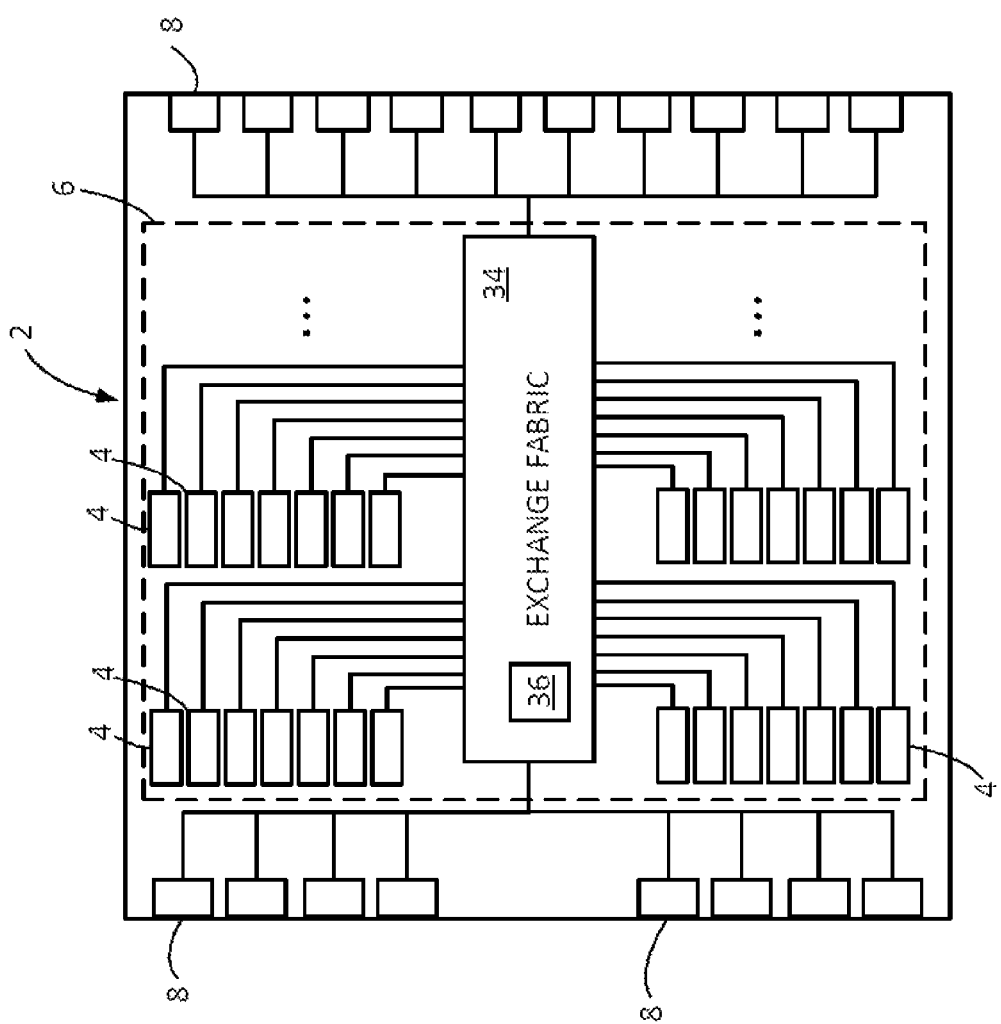
FIG. 1 is a schematic block diagram of a processor chip comprising multiple tiles.

Reference is made to FIG. 1, which illustrates an example processing unit 2. This example processing unit 2 is a multi-tile processing unit 2. The processing unit 2 may be an Intelligence Processing Unit (IPU) that is described in our earlier U.S. application Ser. No. 16/538,980, the contents of which are incorporated by reference. Each of the IPUs is formed on a separate integrated circuit.

The processing unit 2 comprises an array 6 of multiple processor tiles 4 and an interconnect 34 connecting between the tiles 4. The processing unit 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 also comprises one or more external links 8, enabling the processing unit 2 to be connected to one or more other processing units (e.g. one or more other instances of the same processing unit 2). These external links 8 may comprise any one or more of: one or more processing unit-to-host links for connecting the processing unit 2 to a host system, and/or one or more processing unit-to-processing unit links for connecting together with one or more other instances of the processing unit 2 on the same IC package or card, or on different cards. The processing unit 2 receives work from the host, in the form of application data which it processes.

The interconnect 34 is configured to enable the different tiles 4 in the array 6 to communicate with one another.

However, as well as there potentially being dependencies between threads on the same tile 4, there may also exist dependencies between the portions of the program running on different tiles 4 in the array 6. A technique is therefore required to prevent a piece of code on one tile 4 running ahead of data upon which it is dependent being made available by another piece of code on another tile 4. This is achieved using a data consistency model.

Parallel programming models for AI and Data Science usually follows a 3-phase iterative execution model: Compute, Barrier, and Exchange. The implications are that data transfer to and from a processor is usually barrier dependent to provide data-consistency between the processors and between each processor and an external storage. Typically used data consistency models are Bulk Synchronous Parallel (BSP), Stale Synchronous Parallel (SSP) and Asynchronous. The processing unit 2 described herein uses a BSP model, but it will be apparent that the other sync models could be utilised as an alternative.

Figure 3:
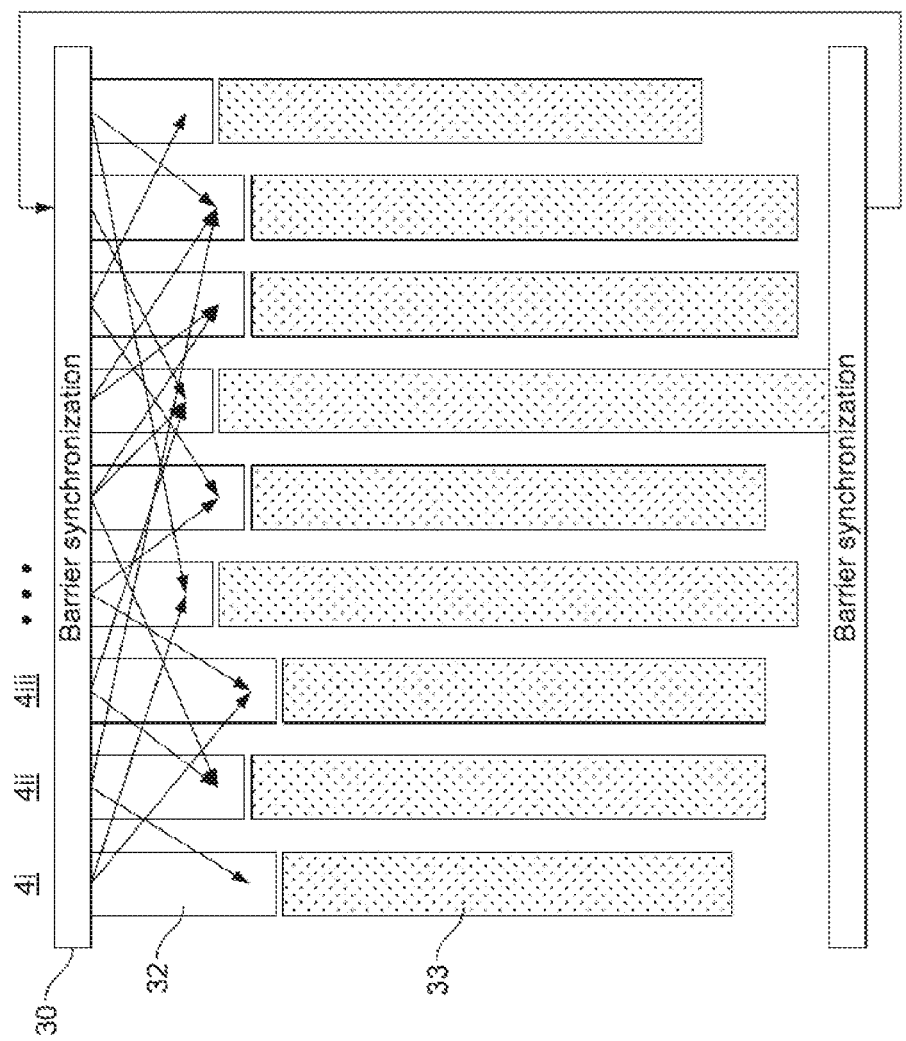
FIG. 3 is another schematic illustration of a BSP model.

Reference is made to FIGS. 2 and 3, which illustrate an implementation of a BSP exchange scheme in which each tile 4 performs a compute phase 33 and an exchange phase 32 in an alternating cycle, separated from one to the other by a barrier synchronization 30 between tiles. In the case illustrated by FIGS. 2 and 3, a barrier synchronization is placed between each compute phase 33 and the following exchange phase 32. During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles 4, but does not perform any new computations until it has received from other tiles 4 any data on which its task(s) has/have dependency. Neither does it send to any other tile 4, any data except that computed in the preceding compute phase. It is not excluded that other operations such as internal control-related operations may be performed in the exchange phase 32. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual tiles which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same processing unit 2 or different processing units could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

FIG. 3 illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that, in this arrangement, some tiles 4 are allowed to begin computing 33 whilst some others are still exchanging.

The BSP model is used for exchange of data between tiles 4 on the processing unit 2. The communication between tiles 4 of a processing unit 2 occurs in time deterministic fashion in which data packets are transmitted without headers as in our earlier application U.S. patent application Ser. No. 16/538,980. Additionally, the BSP model may also be used for the exchange of data between processing units 2.

In embodiments, multiple instances of the processing unit 2 can be connected together to form an even larger array of tiles 4 spanning multiple processing unit 2. The processing units 2 connected together in this way may participate in barrier synchronisations with one another to exchange data with one another. Barrier synchronisations that take place only between tiles 4 on a single processing unit 2 are referred to as internal (on-chip) synchronisations. On the other hand, barrier synchronisations that take place between processing units 2 are referred to as external (inter-chip) synchronisations.

Figure 4:
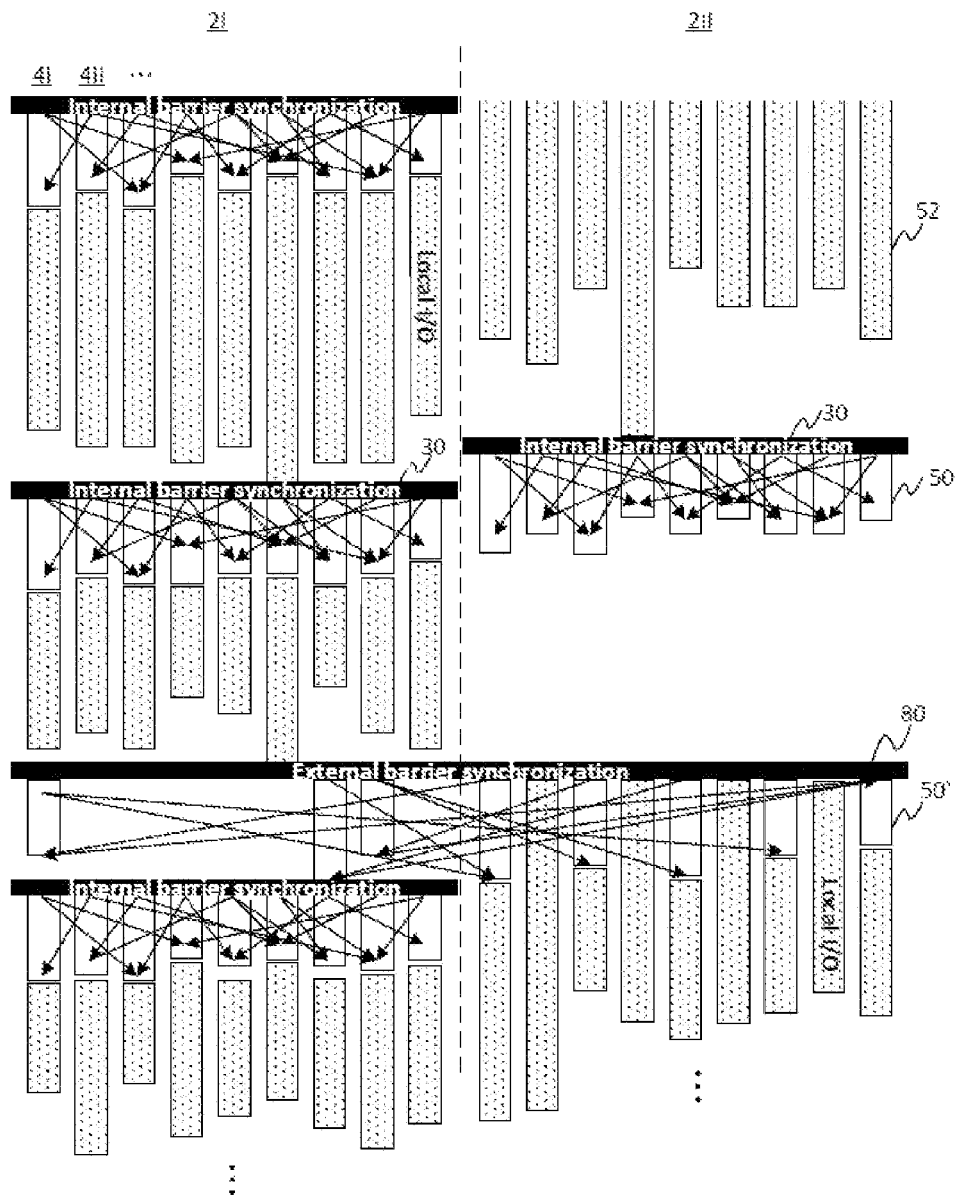
FIG. 4 is a schematic illustration of a multi-tier BSP scheme.

Reference is made to FIG. 4, which illustrates an example BSP program flow involving both internal and external synchronizations. As shown, the flow comprises internal exchanges 50 (of data between tiles 4 on the same chip 2) and an external exchange 50' (of data between tiles 4 on different chips 2). The program flow in FIG. 4 illustrates a program flow for a first processing unit 2i and a second processing unit 2ii.

As illustrated in FIG. 4, the internal BSP supersteps (comprising the internal exchanges 50 of data between tiles 4 on the same chip 2) are kept separate from the external sync and exchange (comprising the external exchanges 50' of data between tiles 4 on different chips 2).

The program may be arranged to perform a sequence of synchronizations, exchange phases and compute phases comprising, in the following order: (i) a first compute phase, then (ii) an internal barrier synchronization 30, then (iii) an internal exchange phase 50, then (iv) an external barrier synchronization 80, then (v) an external exchange phase 50'. The external barrier 80 is imposed after the internal exchange phase 50, such that the program only proceeds to the external exchange 50' after the internal exchange 50. Note also that, as shown with respect to chip 21 in FIG. 4, optionally a compute phase may be included between internal exchange (iii) and external barrier (iv).

This overall sequence is enforced by the program (e.g. being generated as such by the compiler). In embodiments, the program is programmed to act in this way by means of a SYNC instruction executed by the tiles 4. The internal synchronization and exchange does not extend to any tiles or other entities on another chip 2. The sequence (i)-(v) (with the aforementioned optional compute phase between iii and iv) may be repeated in a series of overall iterations. Per iteration there may be multiple instances of the internal compute, sync and exchange (i)-(iii) prior to the external sync & exchange. I.e. multiple instances of (i)-(iii) (retaining that order), i.e. multiple internal BSP supersteps, may be implemented before (iv)-(v), i.e. the external sync and exchange. Note also, any of the tiles 4 may each be performing their own instance of the internal synchronization and exchange (ii)-(iii) in parallel with the other tiles 4.

Thus per overall BSP cycle (i)-(v) there is at least one part of the cycle (ii)-(iii) wherein synchronization is constrained to being performed only internally, i.e. only on-chip.

Note that during an external exchange 50 the communications are not limited to being only external: some tiles may just perform internal exchanges, some may only perform external exchanges, and some may perform a mix.

Also, as shown in FIG. 4, some tiles 4 may perform local input/output during a compute phase. For example, they may exchange data with a host or other type of external storage.

Note also that, as shown in FIG. 4, it is in general possible for any or all tiles to have a null compute phase 52 or a null exchange phase 50 in any given BSP superstep.

Each of the synchronisation barriers shown in FIG. 4 is passed by the tiles 4 once an exchange of transmission of sync requests and acknowledgments has completed. For an internal barrier synchronisation, each tile 4 in a processing unit 2, once it reaches an internal barrier synchronisation, sends an internal sync request to the internal synchronisation controller 36 in the interconnect 34 (see FIG. 1). When the internal synchronisation controller 36 has received sync requests from all of the tiles 4 that are part of the processing unit 2, the sync controller 36 returns sync acknowledgments to each of the tiles 4. Upon receiving the sync acknowledgments, each of the tiles 4 then enters the exchange phase in which data exchange between the tiles 4 occurs. This technique ensures thagt each tile 4 must reach the barrier before any of the tiles can progress to the exchange phase.

For an external barrier synchronisation, the exchange of sync requests and acknowledgments takes place between a group of processing units 2, referred to as a synchronisation group. Following the exchange of sync requests and acknowledgments for an external barrier synchronisation, the processing units 2 exchange data during an exchange phase.

Each of the tiles 4 on the processing unit 2, once it reaches an external barrier synchronisation, issues an external sync request to external sync logic (not shown in FIG. 1) that is associated with the processing unit 2. Once the external sync logic has received a sync request from all of the tiles 4 on the processing unit 2, it either acknowledges those sync requests or propagates a sync request to external sync logic associated with another processing unit 2. The action taken by external sync logic in another processing unit 2 in response to a sync request depends upon whether the logic is defined as the master for the sync group or as a propagation node for that group. The propagation nodes propagate their received sync requests towards the master defined for the sync group. The sync master, once it has received external sync requests for each of the processing units 2 that are part of the sync group, returns sync acknowledgments to the external sync logic associated with each of the other processing units 2 in the sync group. The sync master also returns sync acknowledgments to each of the tiles 4 in its own processing unit 2. Each external sync logic (i.e. the propagation nodes) of the other processing unit 2 in the sync group, upon receiving a sync acknowledgment, returns sync acknowledgments to the tiles 4 of its processing unit 2.

Figure 5:
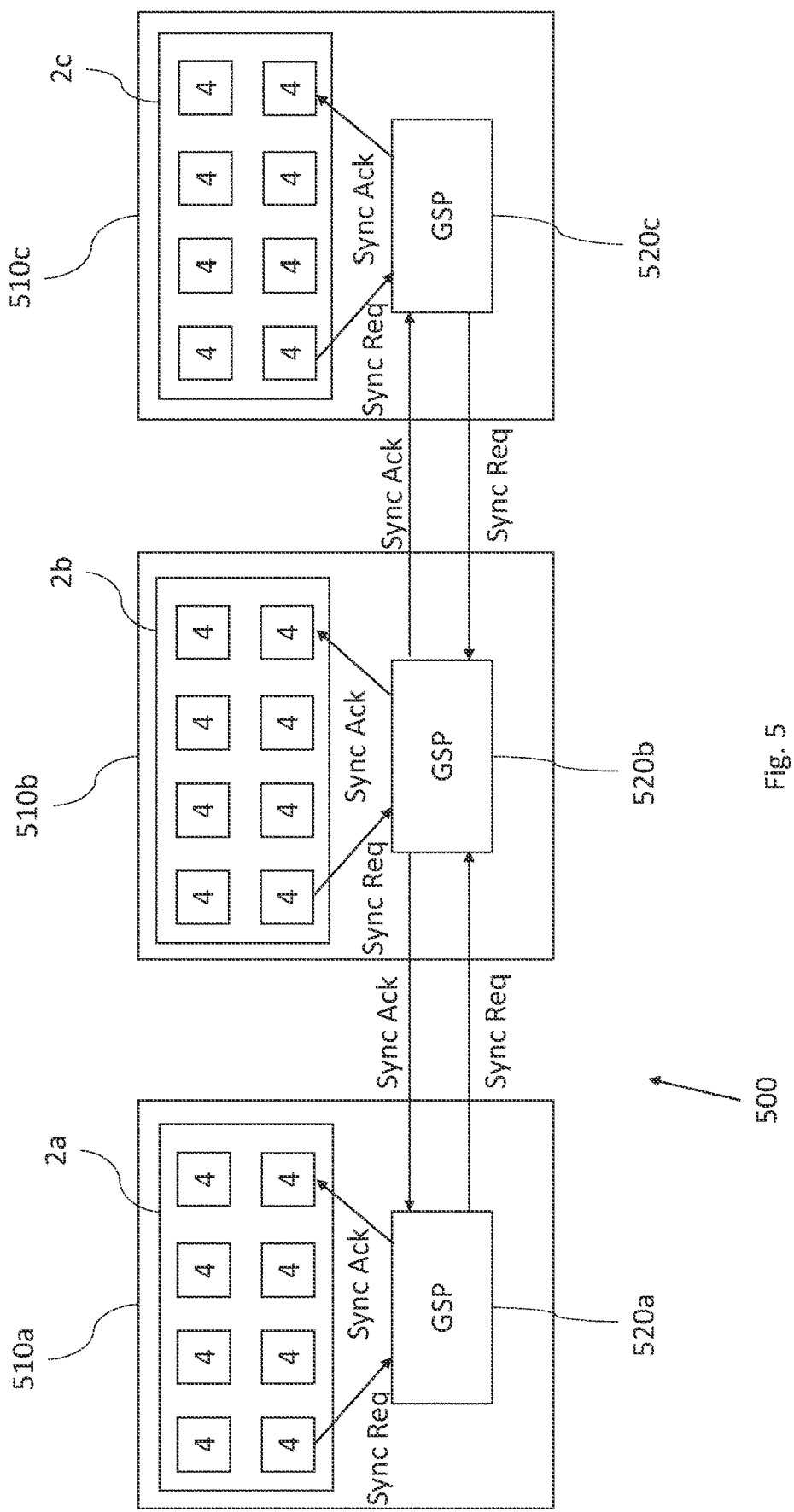
FIG. 5 is a schematic illustration of the exchange of sync requests and acknowledgments for an external synchronisation.

Reference is made to FIG. 5, which illustrates an example of the exchange of sync requests performed for an external barrier synchronisation for exchange of data between processing units 2. The system 500 shown comprises three processing units 2a, 2b, 2c (collectively referred to as processing units 2) that are part of a sync group. Each of the three processing units 2 belongs to a separate integrated circuit 510a, 510b, 510c (collectively referred to as chips 510). Each of the chips 510 comprises external sync logic 520, referred to as a global sync peripheral (GSP) 520. In some cases, the external sync logic 520 may located off-chip, e.g. on a gateway device.

When each of the tiles 4 reaches the barrier, it issues a sync request to its associated GSP 520. In FIG. 5, for simplicity, only one tile 4 in each processing unit 2 is shown as sending a sync request to its associated GSP 520, but in practice all of the tiles 4 on the chip would issue sync requests to the GSP 520. In some embodiments, each sync request contains an indication of the sync group to be used for the barrier synchronisation, where the GSPs 520 propagate and/or acknowledge received sync requests in accordance with the indication in the requests. In other embodiments, the writing of the sync request to the GSP 520 is preceded by a write from a nominated tile 4 of the associated processing unit 2 of a sync group to be used for the upcoming barrier synchronisation. The indication of the sync group is used to select configuration settings for the GSP 520. The GSP 520, when the barrier synchronisation is reached, propagates and/or acknowledge received sync requests in accordance with the selected configuration settings.

In this example, the GSPs 520a, 520c are configured as propagation nodes. After receiving sync requests from all of the tiles 4 in processing unit 2, the GSPs 520a, 520c each propagate a sync request upstream to the sync master defined for the sync group, i.e. GSP 520b. GSP 520b, after having received sync requests from GSPs 520a, 520c and from all the tiles 4 of its associated processing unit 2b, issues sync acknowledgments downstream to the tiles 4 of processing unit 2b and to the GSPs 520a, 520c. The GSPs 520a, 520c respond to the received acknowledgements by issuing sync acknowledgements to the tiles 4 in their respective processing units 2a, 2c.

In response to receiving the sync acknowledgements, the tiles 4 pass the barrier synchronisation and exchange data with the other processing units 2 of the sync group during the exchange phase. This exchange of data between different processing units 2 is done in a non-time deterministic manner as described in our earlier application U.S. application Ser. No. 15/886,065.

Different sync groups can be defined for the exchange of data at each external barrier synchronisations. These sync groups are programmed into the local programs that execute on the processing units. The tiles 4 execute sync instructions to generate the sync requests at the barrier synchronisation. The sync instruction takes the sync group as an operand and controls between which processing units 2 each sync occurs.

Figure 6A:
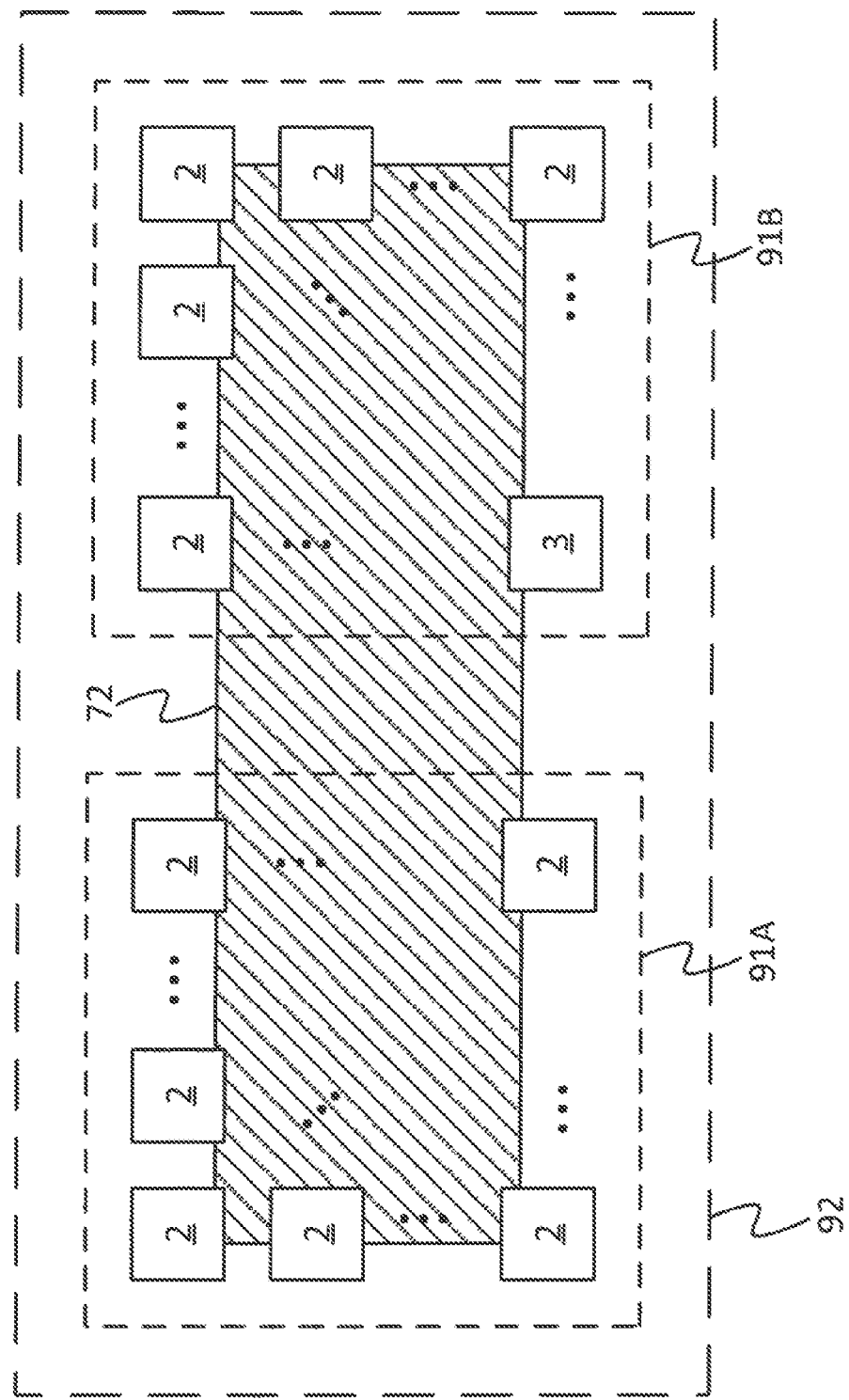
FIG. 6A is another schematic illustration of different synchronisation groups.

Reference is made to FIG. 6A, which illustrates multiple different possible external sync groups, e.g. group_1 or group_2. In embodiments these correspond to different hierarchical levels. That is to say, each higher hierarchical level 92 (e.g. group 2) encompasses two or more groups 91A, 91B of at least one lower hierarchical level. In embodiments, there are just two hierarchical levels, but higher numbers of nested levels are not excluded. To initiate a barrier synchronisation, execution units in the tiles 4 of the processing units 2 execute SYNC instructions. The operand in the SYNC instruction indicates the sync group. If the operand of the SYNC instruction is set to the lower hierarchical level of external sync group (SYNC group_1), then the above-described sync and aggregation operations are performed in relation to the tiles 4 on the chips 2 in only the same lower-level external sync group as the tile on which the SYNC was executed. If, on the other hand, the operand of the SYNC instruction is set to the higher hierarchical level of external sync group (SYNC group_2), then the above-described sync and aggregation operations are automatically performed in relation to all the tiles 4 on all the chips 2 in the same higher-level external sync group as the tile on which the SYNC was executed.

In response to the opcode of the SYNC instruction having an external sync group as an operand, each tile 4 of that sync group causes the sync level specified by the operand to be signalled to its associated GSP 520. In response to this, the GSPs 520 conducts the process of synchronisation request (sync_req) and acknowledgment (sync_ack) to be performed only amongst the tiles 4 of the signalled group.

Note that in other embodiments, the sync groups that can be specified by the mode of the SYNC instruction are not limited to being hierarchical in nature. In general, a SYNC instruction may be provided with modes corresponding to any kind of grouping. For instance, the modes may enable selection from amongst only non-hierarchical groups, or a mixture of hierarchical groupings and one or more non-hierarchical groups (where at least one group is not entirely nested within another). This advantageously enables the flexibility for the programmer or compiler, with minimal code density, to select between different layouts of internally-synchronous groups that are asynchronous with respect to one another.

In addition to an external barrier synchronisation providing for exchange between processing units 2, an external barrier synchronisation may be performed for exchanging data between the processing unit 2 and a host system. Such data may comprise application data provided by the host system for processing by the processing unit 2. The data may comprise results of processing by the processing unit 2 that are provided to the host system.

This type of barrier synchronisation is referred to as a barrier synchronisation with host involvement.

Figure 6B:
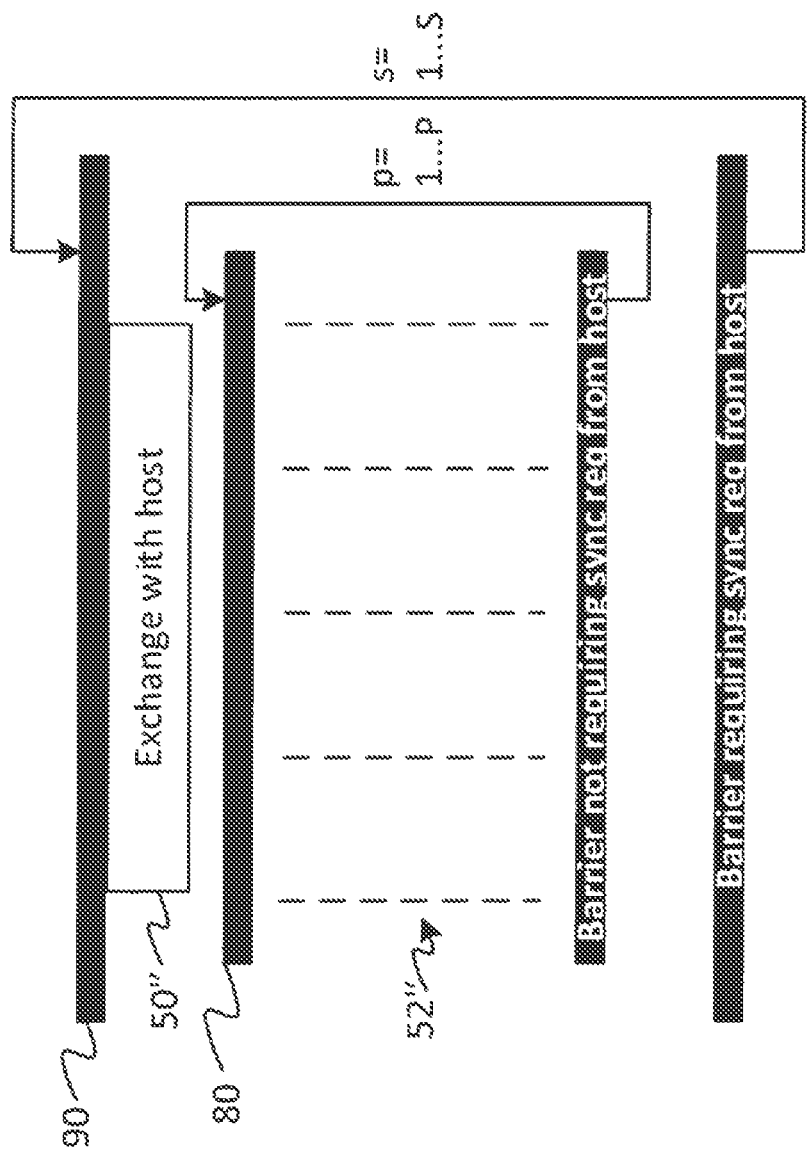
FIG. 6B schematically illustrates a program flow involving a host sync proxy.

The relationship between barrier synchronisations with host involvement and other barrier synchronisations is illustrated in FIG. 6B. This Figure illustrates the barrier synchronisations participated in by an example processing unit 2. The processing unit 2 is allowed to participate in a number P of barrier synchronisations 80, before a barrier 90 also requiring sync acknowledgment from the host is imposed. The P barrier synchronisations require sync requests from all the (non-abstaining) tiles 4 in the relevant sync group. The subsequent barrier synchronisation 90 requires sync requests from all the (non-abstaining) tiles 4 in the processing unit 2 and that the host has previously indicated permission to pass the particular barrier. After the barrier 90, an exchange 50" may be performed between the host and one or more of the tiles 4 of the processing unit 2, e.g. for one or more of the tiles 4 to report computation results to the host.

This barrier synchronisation and the associated data exchange is carried out using a network interface device for interfacing between the processing unit 2 and the host system. The network interface device is described as being a gateway device, but could be another type of network interface device. The gateway device is described in detail in earlier application Ser. No. 16/235,109, which is incorporated by reference.

Figure 7:
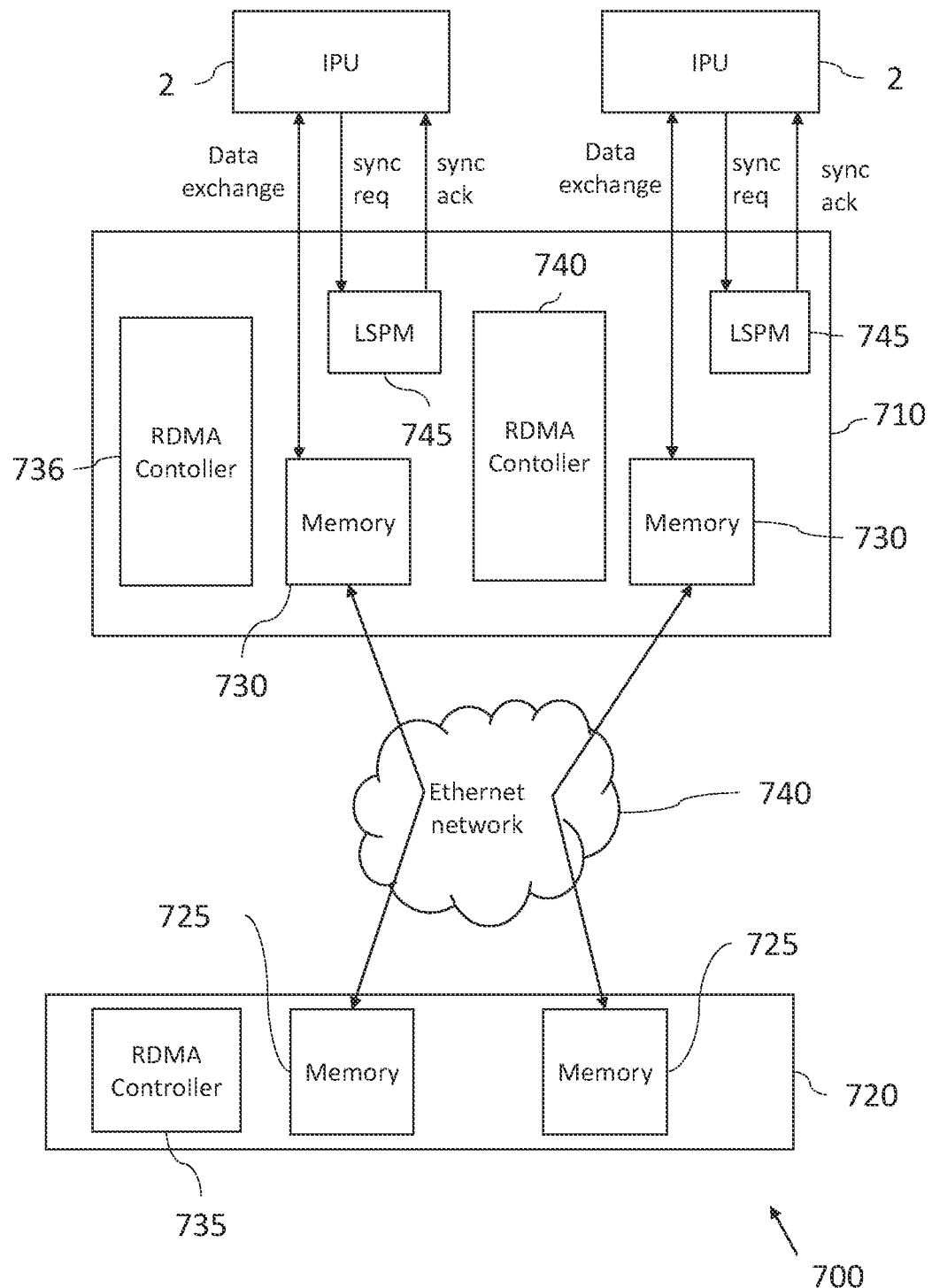
FIG. 7 is a schematic illustration of two accelerators and a gateway communicating via a network with a host system.

Reference is made to FIG. 7, which illustrates an example of a data processing system 700 in which processing units 2 are configured to communicate with the host system 710 via the gateway 720. In this example, a single gateway 720 is configured to interface two processing units 2 with the network 740. However, in other embodiments each such gateway 720 may interface a different number (e.g. one) of processing units 2 with the network 740.

The host system 720 comprises a buffer 725 associated with each processing unit 2. Each of the buffers 725 has an associated buffer 730 on the gateway 710. The buffer 730 on the gateway 710 is a mirror of the associated buffer 725 on the host 720. Read and write requests are issued over the network 740 in order to synchronise the data in the host buffers 725 with the data in the gateway buffers 730. The read and write requests may be RDMA read and write requests. One or more RDMA controllers 735 are present in the host 720 for issuing RDMA read/writes to the gateway 710 to transfer data between buffers 725 and buffers 730. Similarly, RDMA controllers 736 are present in the gateway 710 to transfer data between buffers 730 and buffers 725. The RDMA exchange occurs over network 740. In embodiments, network 740 is Ethernet network 740. In this case, the data is sent over network 740 via RDMA over Converged Ethernet (RoCE).

Although the primary example discussed herein is of sending data via RoCE, in other examples different networking technology may be used. For example, the data may be sent over network 740 using data plane development kit (DPDK) over regular Ethernet. Using RDMA, however, has the advantage of being lower latency. In embodiments in which a different protocol other than RDMA is used, the RDMA controllers 725, 735, 736, 740 shown in FIGS. 7 and 9 may be other types of processing circuitry used for performing the data transfer operations described.

The processing units 2 are configured to, at predefined points in their allocated programs, initiate barrier synchronisations in order to exchange data with their associated memories 730 on the gateway 710. At such a predefined barrier synchronisation, one or both of the processing units 2 sends a sync request to an associated external sync logic 745 in the gateway 710. The external sync logic 745 is shown as a local sync propagation module (LSPM) 745. Upon receiving the sync request, each LSPM 745 is configured to acknowledge the sync request. A processing unit 2 upon receiving such a sync acknowledgment, performs data exchange with its associated memory 730 on the gateway 710. The memory 730 may be memory mapped to memory of the processing unit 2. In this case, the processing unit 2 issues memory mapped I/O (MMIO) read/writes to send and receive data from the memory 730. During the exchange phase, the processing unit 2 may send results of its processing generated in a preceding compute phase to the memory 730 and receive workloads from memory 730 to be processed in a subsequent compute phase. The sync request, acknowledgments and data exchange are carried out over PCIe links between the processing unit 2 and the gateway 710.

Figure 8:
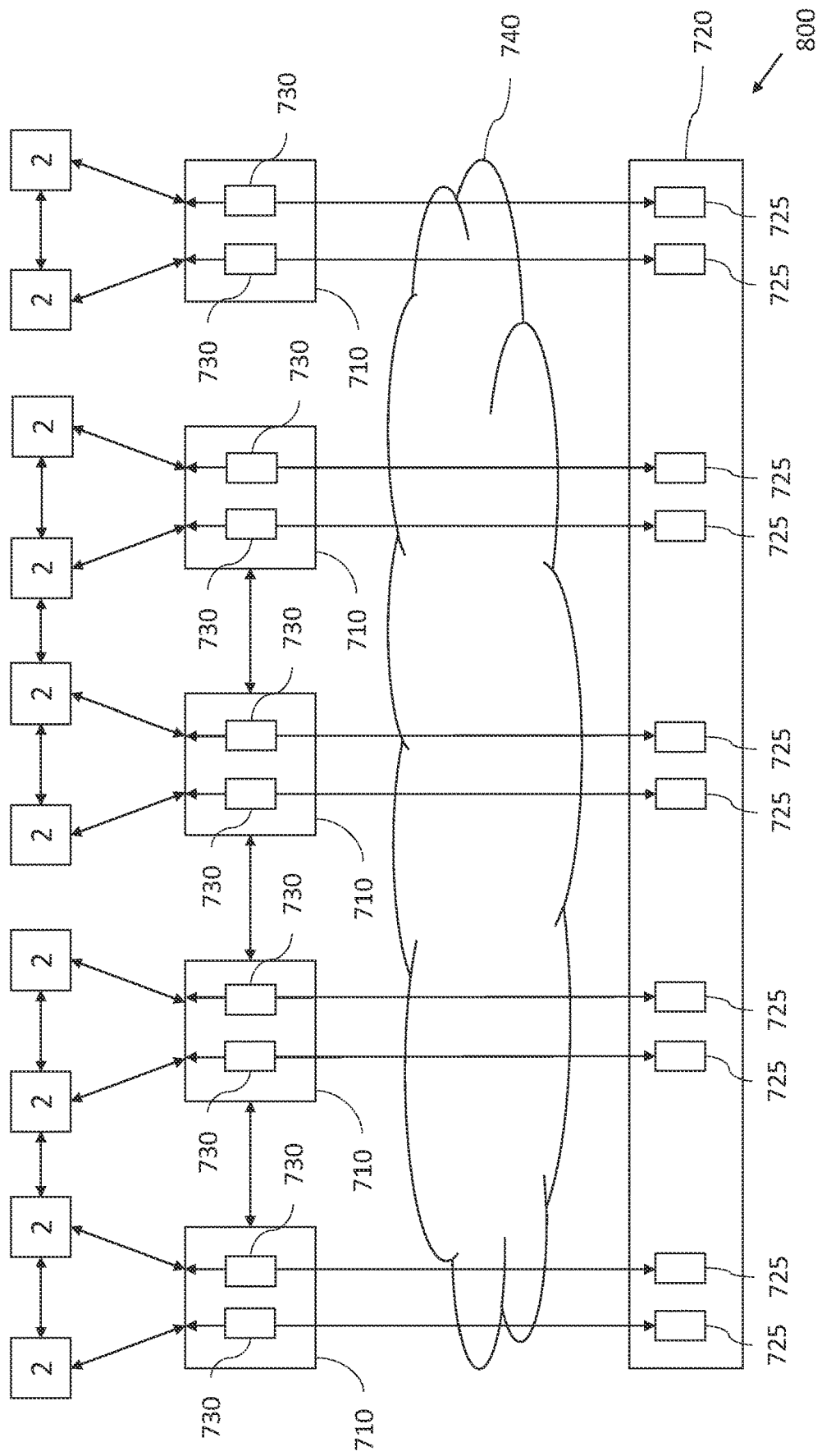
FIG. 8 is a schematic illustration of a larger number of accelerators and gateways communicating via a network with a host system.

Although in FIG. 7, only two processing units 2 are shown as communicating with a host 720, embodiments of the invention enable a large number of processing units to communicate with the host 720. Reference is made to FIG. 8, which illustrates an example of a system 800 comprising a plurality of processing unit 2 communicating with a single host 720. The processing units 2 together are configured to run a distributed application, by each executing a local program provided by the host 720. The processing units exchange data with the host via buffers 730 and exchange data with one other at predefined synchronisation points in the local programs. The data exchange between the processing units 2 may occur via PCIe links between the processing units 2 or via PCIe links between the gateways 710. The data exchange between the gateways 710 and the host 720 occurs via connections over network 740. There is a separate connection for each processing unit 2. Each of these connections may be an RDMA connection.

Figure 9:
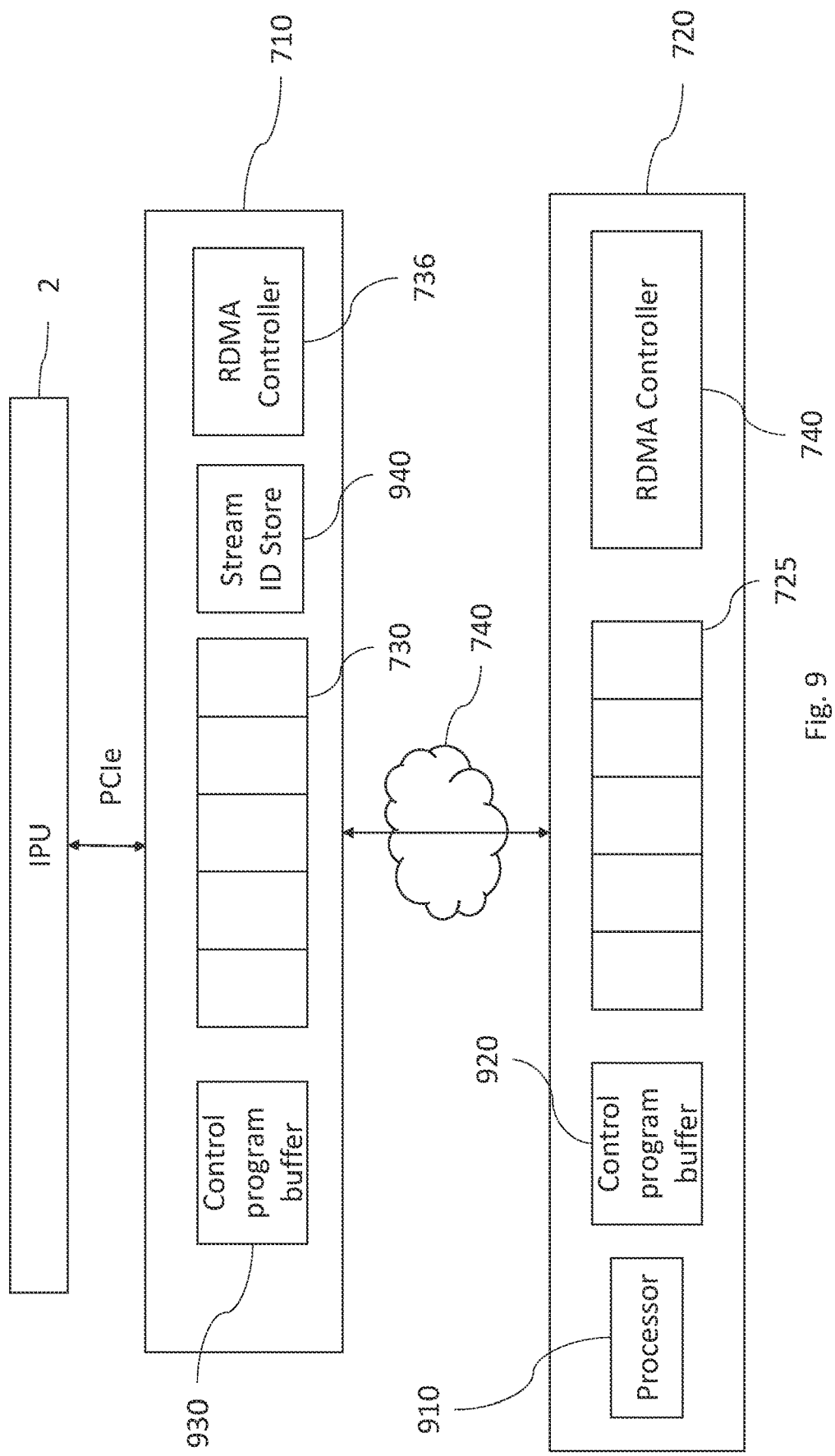
FIG. 9 is a further schematic illustration of a system in which data exchange is performed between an accelerator subsystem and a host.

Reference is made to FIG. 9, which illustrates the interaction between the host system 720 and one of the processing units 2 in greater detail. The compilation and provision of the program to the processing unit 2 and the subsequent data exchange that results from execution of the program is here described.

As shown, the host 720 comprises at least one processor 810 that is configured to compile a set of programs to run on the processing units 2. Together the local programs produced from the source code for an application constitute the compiled application. Each of the programs takes the form of an executable image. The at least one processor 810 receives a set of source code and based on a compiler program, produces a set of local programs from the source code. The compilation process includes producing separate local programs and allocating them across processing units 2. As part of the compilation process to produce the local programs, the at least one processor 810 inserts into each local program, a set of exchange synchronisation points. At each of these points in the execution of the local program, the respective processing unit 2 is configured to participate in a barrier synchronisation. Some of the barrier synchronisation are internal barrier synchronisation as described above. Some of the barrier synchronisations are external barrier synchronisations for exchanging data with one or more other processing units 2 involved in the running of the application. Some of the barrier synchronisations are external barrier synchronisations for exchanging data with the host 720 via the attached gateway 710.

After the host 720 has compiled the local program for a processing unit 2, the program is stored in a control program buffer 920. The host has a separate such control program buffer for each processing unit 2. Comments made regarding the control program buffer 920 apply equally well to these other control program buffers. As with the buffers 725, 730 used for exchanging data between the host 720 and the gateway 710, the buffer 920 and the buffer 930 are mirrors of one another. The local program is transferred from buffer 920 over the network 740 in one or more writes to buffer 930. This transfer may be carried out by one or more RDMA controllers 736 that are configured to transfer the local program from buffer 920 over the network 740 in one or more RDMA writes to buffer 930. The processing unit 2 is configured to issue reads to the gateway 710 to read the program from the control program buffer 930. The processing unit 2 comprises a small amount of secondary bootloader code for performing such reads. The reads are MMIO reads.

Once the processing unit 2 has loaded the local program from buffer 930, the processing unit 2 executes the program. In order to process the workloads, the program must first receive those workloads from the host 720. The host 720 stores the workloads required by the program during its execution. The host 720 stores these prior to them being made available to the processing unit 2 in the buffer 725. The data (including the workloads) is divided into different streams, which the processing unit 2 may select to read and write from in dependence upon the outcome of different conditions in the execution of its local program.

Each stream may for example comprise a sequence of images (individual still images or video frames), or an audio stream of one or more audio samples, or any other sequence of experience data (e.g. online shopping habits, etc.) which is being sent from the host subsystem 720 to the processing unit 2 in order for the processing unit 2 to use as inputs to a machine learning or machine intelligence algorithm run on the plurality of processing unit 2. For example, this could be to train a neural network based on the streamed data, or to make inferences from the data based on an already-trained neural net. In an example, where the stream is in the direction from processing unit 2 to host subsystem 720, the stream could comprise a stream of inferences resulting from a machine intelligence algorithm such as a trained neural net run on the processing unit 2.

The buffers 725, 730 are multi-stream buffers 725, 730 that are used for storing for transfer, data of multiple different streams. The buffer 725, 730 are also bidirectional and data of each stream can be both written and read from each buffer 725, 730. The processing unit 2 can selectively read/write from the different streams by supplying identifiers of the streams to the gateway. After the local program has been loaded to the processing unit 2, the processing unit 2 executes this program to issue a write to the processing unit 2 of an identifier of the stream to be read from. The identifier of the stream comprises one or more of: an index or an address in the buffers 725, 730. The identifier of the stream may identify one of the memory regions (each of which is associated with one of the streams) of the buffers 725 730 shown in FIG. 9, rather than identifying a stream explicitly. The gateway 710 receives the identifier of the stream, which is temporarily stored in stream ID store 940. The gateway 710, in response to receiving the identifier of the stream, writes that identifier over the network 740 to the host 720. In response to receipt of the identifier, the host 720 writes data of the identified stream from the buffer 725 over the network 740 to the buffer 730. The processing unit 2 then reads the data from the buffer 730.

After having obtained a workload from the buffer 730, the processing unit 2 processes that workload in accordance with its local program. At some point during its execution, the processing unit 2 writes an indication of the stream, which is to be read from or written to in an exchange phase following an upcoming barrier synchronisation. This write could take place during a compute phase of the processing unit 2 or during an earlier exchange phase. Later during execution of the program, the synchronisation barrier is reached. At this point, the processing unit 2 performs the sync req/ack procedure described above with respect to FIG. 7. Following this procedure, the processing unit 2 reads and writes from the buffer 730. When doing so, the processing unit 730 reads and writes from the memory region of buffer corresponding to the stream identified by the indication of the stream provided. In response to the data writes to that stream, the gateway 710 writes the data to the buffer 725. Hence, during the exchange phase, the host 720 receives the results of processing workload data from the processing unit 2, and the processing unit 2 receives the further workload data from the host 720.

Figure 10:
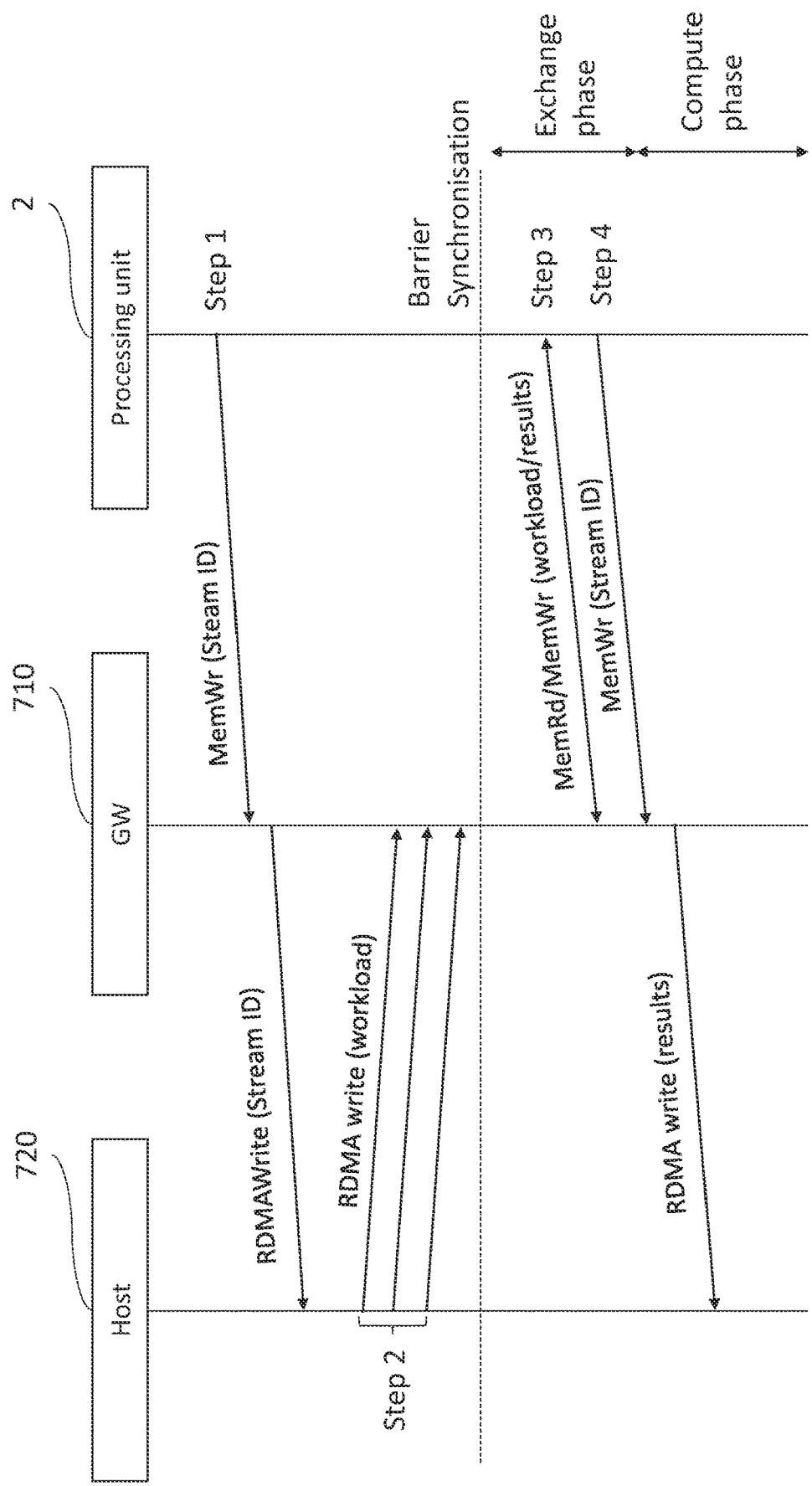
FIG. 10 is a message sequence diagram illustrating the exchange of messages between the host and the accelerator via a gateway.

Reference is made to FIG. 10, which illustrates a message sequence diagram illustrating the exchange of messages between the host 720, gateway 710, and processing unit 2. As shown in FIG. 10, at step 1, the processing unit 2 writes the identifier of the stream to the gateway. The gateway receives this stream identifier and writes it to the host 720. At Step 2, in response to receipt of the stream ID, the host 720 writes the workloads to the gateway 710. As shown, a barrier synchronisation is reached by the processing unit 2. Following the barrier synchronisation, the processing unit 2 reads from the gateway 710, the workloads that were provided from the host 720 at step 2. Also, at step 3, the processing unit 2 writes results obtained from processing an earlier workload.

At step 4, the processing unit 2 writes to the gateway 710 an identifier of the stream that was written to by the processing unit 2 at step 3. In response to receipt of the stream identifier, the gateway 710 writes to the host, the data written by the processing unit 2 at step 3.

The processing unit 2 following its data exchange proceeds to a further compute phase. The process illustrated in FIG. 10 for exchanging data may be performed a plurality of times.

Although in FIG. 10, it is illustrated that the processing unit 2 sends a control message MemWr to initiate data transfer between the gateway 720 and the host 710, in other embodiments, the host 710 may initiate this data transfer by periodically synchronising the buffer 725 and the buffer 730.

Figure 11:
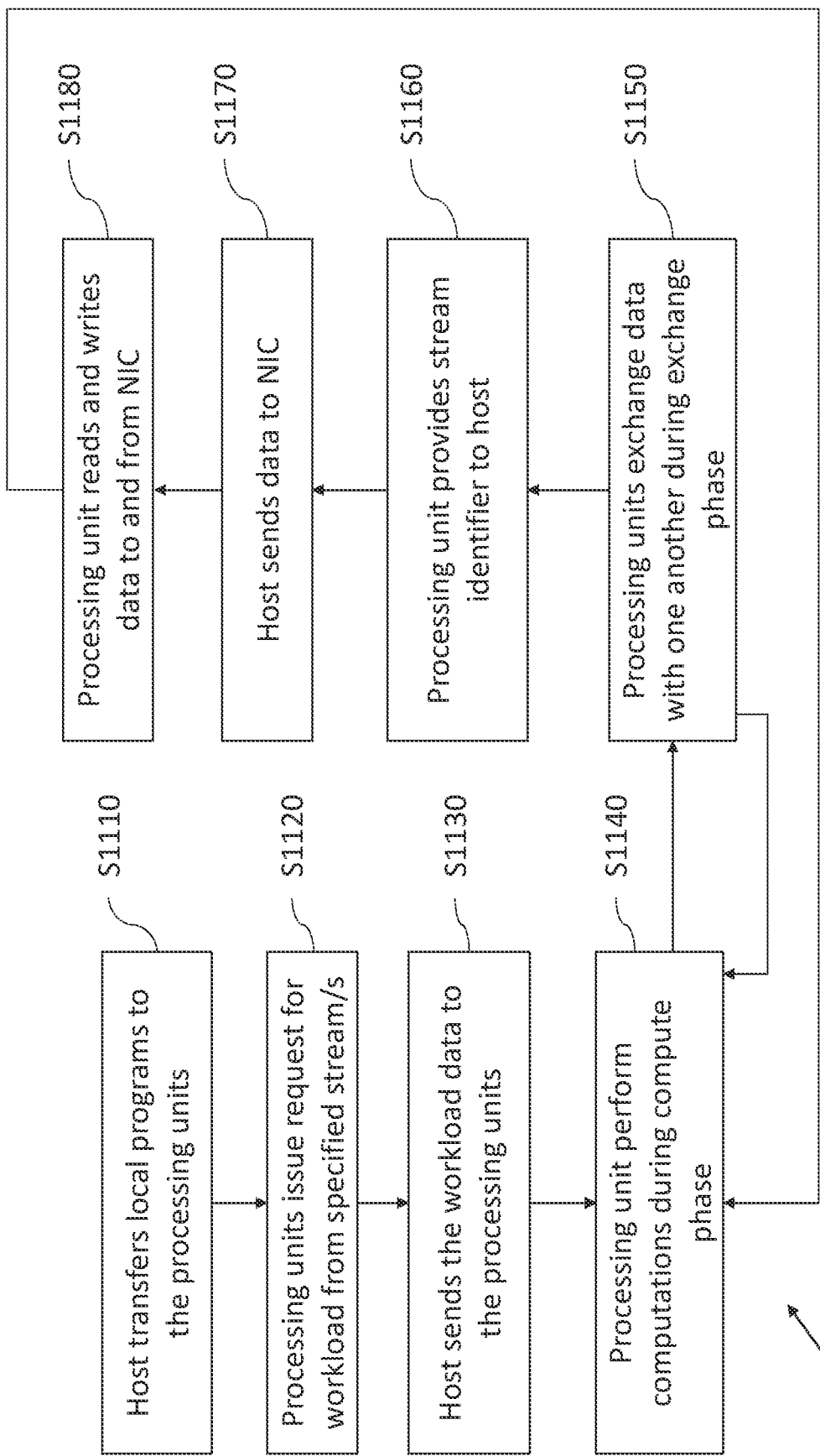
FIG. 11 illustrates a method according to embodiments of the application.

Reference is made to FIG. 11, which illustrates an example method 1100 according to embodiments of the application. This Figure gives an overview of the method 1100 performed by the system comprising the host, network interface device (i.e. the gateway in the above described in embodiments), and the processing units configured to run the application by each executing a local program.

At S1110, the host transfer the local programs to the processing units.

At S1120, each processing unit issues a request for workload data from specified stream/s. The streams specified by each processing unit depend upon the local program allocated to that processing unit. The request along with the specified stream/s is provided to the host via the network interface device.

At S1130, in response to the receipt of each of the requests, the host writes the data from the identified streams. The host writes this data to network interface devices for delivery to the processing units. The processing units read the data from the network interface device memory.

At S1140, the processing units perform computations during a compute phase to perform calculations using the workload data received at S1130. The calculations performed are specified in the local programs provided to each processing unit.

At S1150, the processing units exchange results of their data processing during S1140. This step is performed using barrier synchronisations between sync groups of processing units. The time of such barrier synchronisations and the definition of the sync groups is specified in the local programs provided to each of the processing units.

Following each such external barrier sync in S1150, the method may return to S1140, where further calculations are performed during a further computer phase.

At a later point in execution of a local program, a processing unit progress to S1160, where the process to initiate data transfer with the host begins. This step may overlap with S1140 or S1150.

At S1160, a processing unit provides a stream identifier to the host via the network interface device.

At S1170, the host writes data of the identified stream to the network interface device.

At S1180, following a pre-compiled synchronisation barrier, the processing unit reads and writes data of the identified stream to/from the network interface device. The network interface device writes the data back to the host.

There is no requirement for each processing unit to perform the steps S1140 to S1180 at the same time, and some processing units 2 may be computing at S1140 or exchanging data at S1150, whilst one or more other processing units 2 are exchanging data with the host at S1180. Other than when a barrier synchronisation is carried out between a group of processing units 2 at S1150, the processing units operate asynchronously with respect to one another. The sequence and timing of the steps as performed by each processing unit depends upon the local program that has been allocated to it by the host.

The invention claimed is:

1. A host system configured to interface over a network with a plurality of subsystems comprising tile computers acting as work accelerators to the host system in accordance with local programs running on each of the subsystems, wherein the host system comprises at least one processor and at least one memory storing computer readable instructions, wherein the at least one processor of the host system is configured to execute the computer readable instructions to compile a set of local programs, each local program for running on a different one of the subsystems, wherein compiling the set of local programs comprises defining a set of synchronisation groups, each synchronisation group comprising at least two of the subsystems, wherein each local program comprises:
 a set of compute instructions to perform, when executed by at least one processor of the respective subsystem, compute operations during one or more of a plurality of compute phases of the respective subsystem; and
 a set of data transfer instructions to, when executed by at least one processor of the respective subsystem, perform a plurality of barrier synchronisations at predefined points in the execution of the respective local program, each of the plurality of barrier synchronisations between one of the plurality of compute phases and a respective exchange phase, wherein each of at least two of the barrier synchronisations are defined between the at least two of the subsystems forming one of the synchronisation groups, wherein at least one of the barrier synchronisations is a synchronisation requiring host involvement for which, in response to an initiator of data transfer provided to the host system by the respective subsystem, data exchange is performed between the respective subsystem and the host system, and wherein the at least one processor of the host system is configured to, in response to each of the initiators of data transfer, exchange data in the respective exchange phase over the network with one of the subsystem from which the initiator was received, the exchange of data comprising synchronising at least part of a buffer of the host system with at least part of a buffer of a network interface device connected to the one of the subsystem from which the initiator was received, wherein:
the buffer of the network interface device is a first multi-stream buffer for storing data of a plurality of different streams, each stream having an identifier;
the buffer of the host system is a second multi-stream buffer for storing data of the plurality of different streams;

each of the initiators of data transfer comprises an identifier of a stream of the plurality of different streams between the host system and the one of the subsystems from which the identifier was received;
exchanging data over the network with one of the subsystems from which the identifier was received comprises sending and/or receiving data belonging to the respective identified stream; and
the at least part of the buffer of the host system comprises a part of the second multi-stream buffer associated with the identified stream, wheren the at least part of the buffer of the network interface device accessible to the one of the subsystem from which the identifier was received comprises a part of the first multi-stream buffer associated with the identified stream.

2. The host system of claim 1, wherein the data exchange occurs using remote direct memory access.

3. The host system of claim 1, wherein the network is an Ethernet network.

4. The host system of claim 1, wherein each of the initiators of data transfer comprises an identifier of a stream between the host system and the one of the subsystems from which the identifier was received,
wherein exchanging data over the network with one of the subsystems from which the identifier was received comprises at least one of sending and receiving data belonging to the respective identified stream.

5. The host system of claim 1, wherein exchanging data over the network with one of the subsystems from which the initiator was received comprises:
prior to one of the plurality of barrier synchronisations defined in the local program of the subsystem from which the initiator was received, sending data to a network interface device accessible to that subsystem; and
following the one of the plurality of barrier synchronisations defined in the local program of the subsystem from which the initiator was received, receiving data from the network interface device accessible to that subsystem.

6. The host system of claim 1, wherein the at least one processor of the host system is configured to cause each of the local programs to be dispatched to the respective subsystems over the network.

7. A subsystem comprising a tile computer configured to interface over a network with a host system, wherein the subsystem is configured to act as a work accelerator to the host system in accordance with a local program running on the subsystem, the subsystem comprising:
at least one processor configured to execute the local program; and
memory configured to store the local program, wherein the local program comprises:
an indication of a synchronisation group for performing one or more of a plurality of barrier synchronisations, wherein the synchronisation group comprises the subsystem and a plurality of further subsystems;
first instructions to perform a plurality of compute operations during one or more of a plurality of compute phases of the subsystem;
second instructions to perform the plurality of barrier synchronisations, each of the plurality of barrier synchronisations being between one of the plurality of compute phases and a respective exchange phase, wherein a first one of the barrier synchronisations has hot involvement for which, following sending of an initiator of data transfer to the host system by the subsystem, data exchange in the respective exchange phase is performed over the network between the subsystem and the host system; and
third instructions for causing the data exchange by causing an excahnge of data between the tile computer and a first buffer of a network interface device of the subsystem, wherein the first buffer is synchronised with a second buffer of the host system,
wherein the initiator comprises an identifier of a steam between the subsystem and the host system,
the first buffer is a first multi-stream buffer for storing data of a plurality of different streams, each stream having an identifier,
the second buffer is a second multi-stream buffer for storing data of the plurality of different streams;
wherein the data exchange comprises exchanging data belonging to the respective identified stream of the plurality of different streams,
wherein the first buffer comprises a part of the first multi-stream buffer associated with the stream, and
wherein the second buffer comprises a part of the second multi-stream buffer associated with the stream.

8. The subsystem of claim 7, wherein the data exchange uses remote direct memory access.

9. The subsystem of claim 7, wherein the network comprises an Ethernet network.

10. The subsystem of claim 7, wherein the local program comprises:
third instructions to perform the data exchange by reading data from the network interface device accessible to that subsystem following the first one of the plurality of barrier synchronisations.

11. A method implemented in a host system, the method comprising:
interfacing over a network with a plurality of subsystems comprising tile computers acting as work accelerators to the host system in accordance with local programs running on each of the subsystems;
compiling the local programs for the subsystems, including defining barrier synchronisations to occur during running of the local programs on the subsystems, wherein each local program comprises:
first instructions to perform compute operations during compute phases of a respective subsystem; and
second instructions to participate in a plurality of the barrier synchronisations, each of the plurality of barrier synchronisations between one of the plurality of compute phases and a respective exchange phase, wherein a first one of the plurality of barrier synchronisations employs host involvement for which, in response to an initiator of data transfer provided to the host system by the respective subsystem, data exchange is performed between the respective subsystem and the host system; and
the method further comprising: exchanging data in the respective exchange phase over the network with each one of the subsystems in response to to respective initiators,
wherein exchanging data comprises synchronising a buffer of the host system with at least part of a buffer of a network interface device connected to the respective subsystem,
wherein:
the buffer of the network interface device is a first multi-stream buffer for storing data of a plurality of different streams, each stream having an identifier, the buffer of the host system is a second multi-stream buffer for storing data of the plurality of different streams, the initiator comprises an identifier of a stream of the plurality of streams between the host system and the respective subsystem, exchanging data comprises sending and receiving data belonging to the respective identified stream, the buffer of the host system comprises a part of the second multi-stream buffer associated with the stream, and the buffer of the network interface device comprises a part of the first multi-stream buffer associated with the stream.

12. The method of claim 11, wherein exchanging data comprises:
using remote direct memory access.

13. The method of claim 11, wherein exchanging comprises:
prior to the first one of the barrier synchronisations, sending data to a network interface device accessible to the respective subsystem; and
following the first one of the barrier synchronisations, receiving data from the network interface device accessible to the respective subsystem.

14. A non-transitory computer readable medium storing computer readable instructions, which when executed by a processor of a host system causes the processor to:
interface over a network with a plurality of subsystems comprising tile computers acting as work accelerators to the host system in accordance with local programs running on each of the subsystems;
compile the local programs for the subsystems, including defining barrier synchronisations to occur during running of the local programs on the subsystems, wherein each local program comprises:
first instructions to perform compute operations during compute phases of a respective subsystem; and
second instructions to participate in a plurality of the barrier synchronisations, each of the plurality of barrier synchronisations between one of the plurality of compute phases and a respective exchange phase, wherein a first one of the plurality of barrier synchronisations employs host involvement for which, in response to an initiator of data transfer provided to the host system by the respective subsystem, data exchange is performed between the respective subsystem and the host system; and
exchange data over the network with each one of the subsystems in the respective exchange phase in response to respective initiators,
wherein the exchange of data comprises synchronizing a buffer of the host system with at least part of a buffer of a network interface device connected to the respective subsystem,
wherein:
the buffer of the network interface device is a first multi-stream buffer for storing data of a plurality of different streams, each stream having an identifier,
the buffer of the host system is a second multi-stream buffer for storing data of the plurality of different streams,
the initiator comprises an identifier of a stream of the plurality of streams between the host system and the respective subsystem,
the exchange of data comprises sending and receiving data belonging to the stream, the at least part of the buffer of the network interface device connected to the respective subsystem comprises a part of the first multi-stream buffer associated with the stream, and the buffer of the host system comprises a part of the second multi-stream buffer associated with the stream.

15. A method implemented in a subsystem for a host system, the subsystem comprising a tile computer, the method comprising:
receiving from a host system over a network, a local program;
executing the local program;
acting as a work accelerator to the host system in accordance with the local program, wherein the local program comprises an indication of a groups for performing one or more of a plurality of barrier synchronisations, wherein the group comprises the subsystem and a plurality of further subsystems;
performing compute operations during a plurality of compute phases of the subsystem;
performing the plurality of barrier synchronisations at points during execution of the local program, each of the plurality of barrier synchronisations being between one of the plurality of compute phases and a respective exchange phase, wherein a first one of the barrier synchronisations requires host involvement; and
performing data exchange over the network with the host system for the first one of the barrier synchronisations, following sending of an initiator of data transfer to the host system;
performing the data exchange by causing an exchange of data between the subsystem and a first buffer of a network interface device for the subsystem, the first buffer being synchronised with a second buffer of the host system,
wherein:
the first buffer is a first multi-stream buffer for storing data of a plurality of different streams, each stream having an identifier,
the second buffer is a second multi-stream buffer for storing data of the plurality of different streams,
the initiator comprises an identifier of a stream of the plurality of different streams between the subsystem and the host system,
the data exchange comprises exchanging data belonging to the stream,
the first buffer comprises a part of the first multi-stream buffer associated with the stream, and
the second buffer comprises a part of the second multi-stream buffer associated with the stream.

16. The method of claim 15, wherein the data exchange uses remote direct memory access.

17. The method of claim 15, further comprising:
performing the data exchange by receiving data from the network interface device accessible to that subsystem following the first one of the plurality of barrier synchronisations.

18. A non-transitory computer readable medium storing computer readable instructions, which when executed by a processor of a subsystem comprising a tile computer causes the processor to:
execute a local program received from a host system over a network;
act as a work accelerator to the host system in accordance with the local program, wherein the local program comprises an indication of a group for performing one or more of a plurality of barrier synchronisations, wherein the group comprises the subsystem and a plurality of further subsystems;

perform compute operations during a plurality of compute phases of the subsystem;

perform the plurality of barrier synchronisations at points during execution of the local program, each of the plurality of the barrier synchronisations being between one of the plurality of compute phases and a respective exchange phase, wherein a first one of the barrier synchronisations requires host involvement;

perform data exchange in the exchange phase over the network with the host system for the first one of the barrier synchronisations, following sending of an initiator of data transfer to the host system; and perform the data exchange by causing an exchange of data between the subsystem and a first buffer of a network interface device for the subsystem, the first buffer being synchronised with a second buffer of the host system, wherein:

the first buffer is a first multi-stream buffer for storing data of a plurality of different streams, each stream having an identifier, the second buffer is a second multi-stream buffer for storing data of the plurality of different streams, the initiator comprises an identifier of a stream of the plurality of different streams between the subsystem and the host system, the data exchange comprises exchanging data belonging to the identified stream, the first buffer comprieses a part of the first multi-stream buffer associated with the stream, and the second buffer comprises a part of the second multi-stream buffer associated with the stream.

* * * * *